Jan. 19, 1943.     S. RUBEN     2,308,545
DIELECTRIC FOR ELECTROSTATIC CONDENSERS AND CONDENSERS MADE THEREFROM
Filed July 19, 1938
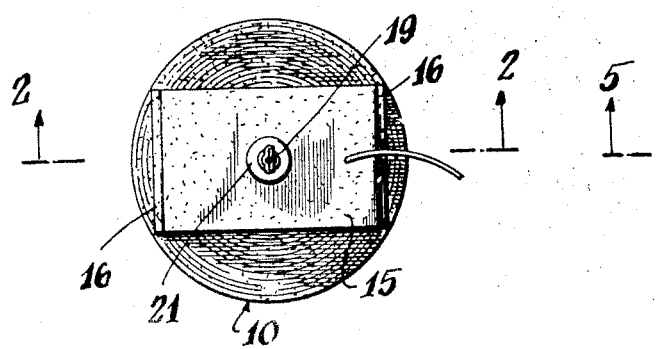
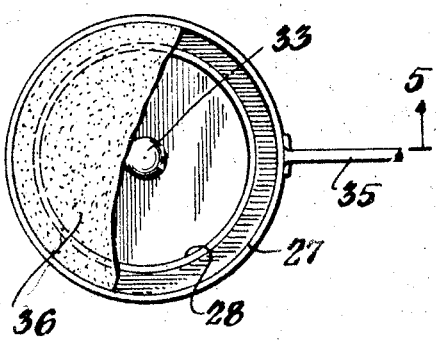
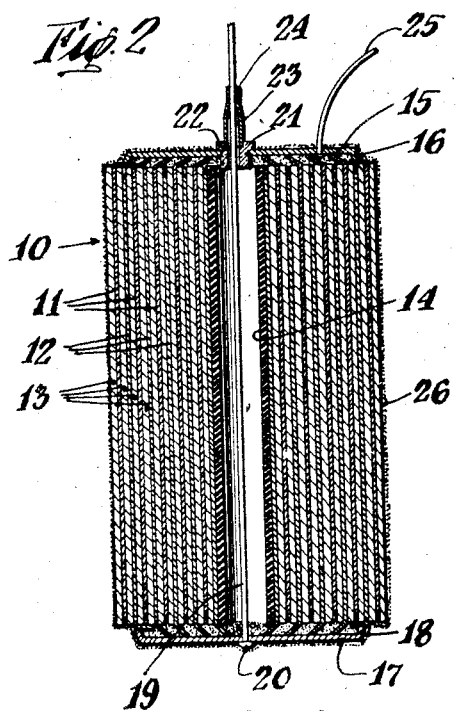
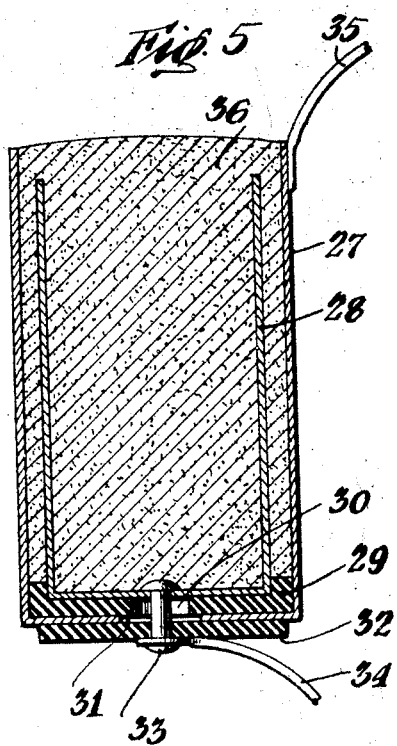
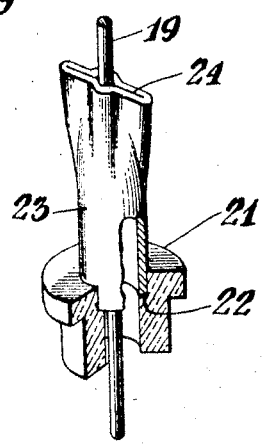
INVENTOR
Samuel Ruben
BY
ATTORNEY Patented Jan. 19, 1943

2,308,545

UNITED STATES PATENT OFFICE 2,308,545

DIELECTRIC FOR ELECTROSTATIC CONDENSERS AND CONDENSERS MADE THEREFROM

Samuel Ruben, New Rochelle, N. Y.

Application July 19, 1938, Serial No. 220,061

3 Claims. (Cl. 106—220)

This invention relates to a dielectric for electrostatic condensers and to condensers made therefrom.

This application is a continuation in part of my co-pending application Serial No. 88,534, filed July 2, 1936, for Electrostatic condenser.

The general object of the invention is the provision of an electrostatic condenser of high voltage break down and insulation resistance, having a capacitance per unit area greater than that available in condensers of commercial production and which employ a solid dielectric medium for impregnation. The condenser of this invention can be constructed at a cost materially lower than electrostatic condensers now commercially used.

A further object is the provision of an electrostatic condenser employing a dielectric of high specific inductive capacity.

Another object is the provision of an electrostatic condenser employing a dielectric which is solid and non-flowing at normal temperatures but which has a low viscosity at high temperatures and which may be easily and conveniently cast into desired shape.

Still another object is the provision of an electrostatic condenser employing a dielectric which also acts as a moisture proof seal.

Another object is an improved method of processing impregnated condensers so as to lower the power factor thereof.

A further object is the provision of a simple, effective and economical means for making electrical contact of the electrodes of the condenser and providing terminals therefor.

Further objects will be apparent as the disclosure proceeds and from the drawing in which Fig. 2 is a cross-sectional view of a condenser constructed according to the invention;

Fig. 1 is a top view in section along the line 2—2 of Fig. 1;

Fig. 3 is a detailed sectional view of the improved terminal means employed in the condenser of Fig. 2.

Fig. 5 is a view in section of a cast condenser made according to the invention and Fig. 4 is a top view along the line 5—5 of Fig. 5.

The dielectric of this invention is a composition of solid hydrogenated castor oil and a solid hydrogenated hydrocarbon such as hydrogenated naphthalene, hydrogenated turpentine or hydrogenated rosin. This new dielectric composition may be employed as an impregnant in association with conventional paper wound electrostatic condensers or in condensers of the cast form with or without mechanical separators.

Vegetable and other oils have been used heretofore for impregnating paper spacer electrostatic condensers. The oil brings about an improvement in capacity but while such condensers are satisfactory for many purposes, there are also some disadvantages associated with their use. Since oil will flow at ordinary temperatures, it is necessary to use unusual precaution in the sealing of the condenser and in the construction of the container. Many unsaturated oils, such as castor oil, tend to oxidize when exposed to the air, resulting in reaction products such as water and acids which cause deterioration of the condenser.

The hydrogenation of the unsaturated compounds tends to stabilize them so that under the electrostatic stresses they do not dissociate and cause ionization.

Hydrogenated castor oil, which is a hard, solid material, has long been known to the condenser art to possess a high dielectric constant but its application as a dielectric medium in an electrostatic condenser has not to date been practical because of its excessively high power factor and tendency to crack. In order to use hydrogenated castor oil as an impregnant, it is necessary to heat it up to liquification temperature so as to allow complete penetration of the absorbent paper spacers. As the oil cools and solidifies, however, minute cracks develop throughout the entire mass, thus bringing about low break down potentials and allowing absorption of moisture. The excessive power factor eventually brings about overheating and decomposition.

Hydrogenated naphthalene is also a hard solid brittle material. While it does not have the high dielectric constant of hydrogenated castor oil, it possesses a very low power factor. Although a good dielectric, its tendency to brittleness and cracking are serious disadvantages.

As set forth in my co-pending application above mentioned, I have found that the combination of hydrogenated castor oil and hydrogenated naphthalene provides a satisfactory dielectric which maintains a solid, hard condition with minimum cracking. A homogeneous combination is obtained which possesses highly desirable characteristics and which is free from defects which heretofore have prevented the successful use of hydrogenated castor oil in electrostatic condensers. For example, the composition possesses a low power factor, it does not crack up upon cooling, it is very strong mechanically and is suitable for casting into any desired shape. Also it possesses excellent sealing characteristics and obviates the need for additional protection against moisture.

The mixture is preferably made by heating hydrogenated napthalene ($C_{40}H_{40}$) (which melts at 140° C.) to a temperature of about 150° C. at which point it is liquid, adding the hydrogenated castor oil (which melts at 80° C.) and stirring until a clear amber colored liquid is obtained. When cooled, the composition is a homogeneous, translucent, opalescent material. An important advantage of this combination is that at impregnating temperatures it is of low viscosity and completely impregnates wound condenser sections.

The proportions of hydrogenated castor oil to hydrogenated napthalene is somewhat dependent upon the use to which the device is to be applied, cost limits, power factor and capacitance.

The following table indicates the comparative properties of paper wound electrostatic condensers employing two .0003" kraft paper spacers, impregnated with the combinations indicated:

| Impregnant | | Capacity mfd. | Power factor 60 cycles |
|---|---|---|---|
| None | | 1 | .16 |
| Percent hydrogenated castor oil | Percent hydrogenated napthalene ($C_{10}H_{18}$) | | |
| 0 | 100 | 1.66 | .35 |
| 5 | 95 | 1.85 | .55 |
| 10 | 90 | 2.00 | .65 |
| 12 | 88 | 2.83 | .70 |
| 15 | 85 | 3.16 | .76 |
| 20 | 80 | 3.3 | .88 |
| 34 | 66 | 2.9 | 1.42 |
| 60 | 40 | 4.0 | 1.65 |
| 100 | 0 | 4.04 | 2.4 |

For most uses, the combination of 15% hydrogenated castor oil and 85% hydrogenated napthalene is preferred as giving a high capacitance with reasonably low power factor and providing good mechanical properties and insulation resistance. A four microfarad condenser using two kraft papers .0003" thick, impregnated with 15% hydrogenated castor oil and 85% hydrogenated napthalene composition will show a resistivity at room temperature better than 4000 megohms.

Taking into consideration the most desirable capacitance and power factor ratios, it would appear that the most satisfactory proportions of the materials will range from about 5% to about 25% hydrogenated castor oil and about 75% to about 95% hydrogenated hydrocarbon. Outside of these limits, either the capacitance obtained will be low or the power factor developed will be too high, except for some direct current applications.

A most unusual characteristic of the material is that at 78° C. there is a sudden drop in capacity and power factor. For example, the capacitance of a 15% hydrogenated castor oil, 85% hydrogenated napthalene unit will, when a temperature of 78° C. is reached, drop in capacity from 3.16 mfd. to 2.4 mfd. and the power factor will drop from 0.76 to 0.26 at 60 cycles. This electrical change occurs with other observable physical changes. For instance, the mixture will change from an opalescent to a clear amber colored material. The temperature of 78° C. probably represents the point at which the hydrogenated castor oil changes from a crystal and enters into solution with the hydrogenated napthlene. This negative temperature capacity characteristic of the condenser may be usefully employed as an excess temperature control and has a number of interesting industrial applications where it is desired to provide an electrical temperature control without moving parts.

In the manufacture of condensers employing the dielectric of this invention, I have found it highly desirable and in most cases practically necessary to cool the condensers immediately after impregnation, as rapidly as possible. To illustrate this, a batch of impregnated condensers rapidly cooled after impregnation by means of a stream of air showed a power factor of about 0.7% at 60 cycles; an identical batch allowed to slowly cool over a one hour period showed a power factor of 1.4% and a similar batch cooled very slowly over a four hour period showed a power factor of 3.8%, indicating that rapid cooling is desirable so as to form a small size crystal of hydrogenated castor oil. Another method, and in some cases a more satisfactory one, is to quench the condensers immediately after impregnation in a cool oil bath. The condensers which have been slowly cooled if reheated to the liquification temperature and then rapidly cooled show the same low power factor as those initially cooled fast, indicating that the physical condition of the mixture relative to the size of the solid castor oil compound is the important factor. This is further checked by color, capacity and refraction measurements.

The dielectric has a high voltage break down, the 15% hydrogenated castor oil, 85% hydrogenated napthalene having a breakdown of about 4000 volts per mil thickness. It is especially suitable for direct current applications where very high insulation resistivity is required, or for use on 60 cycle applications. The combination is very resistant to water vapor and this tends to simplify sealing problems ordinarily encountered in electrostatic condenser construction.

While hydrogenated naphthalene is considered preferable as a material into which the hydrogenated castor oil will completely dissolve to form a clear liquid when hot and stay in suspension when cool, I have found that hydrogenated turpentine or hydrogenated rosin will also form useable mixtures in the same proportions. Equivalents of these materials such as are obvious to those skilled in the art, are included within the scope of this patent and the claims thereof.

Hydrogenated rosin and hydrogenated turpentine, like the hydrogenated naphthalene of this invention are solid polymer resins. All three materials are polymerized, thermoplastic, non-heat hardening, thermoadhesive, liquifiable and possess low power factors. By the term "liquifiable" is meant that these resins may be repeatedly heated to liquid form and when cooled revert to their original condition.

I have found it possible to add polymerized styrene in various proportions to the hydrogenated castor oil-hydrogenated naphthalene mixture. Such additions tend to further reduce the power factor of the condenser and also affect the maximum operating temperature of the condenser.

In order to further describe condensers of this invention and their method of manufacture reference is made to the accompanying drawing which illustrate two types of units.

In Figs. 1, 2 and 3, the condenser section 10 comprises a pair of metal foil electrodes 11 and 12, preferably .0003" aluminum wound together with a pair of kraft paper spacers 13 .0003" thick. The foils are offset so that foil 11 projects beyond the paper at the top of the roll and terminates short of the spacers at the bottom and foil 12 projects at the bottom and is overlapped by the spacers at the top. The foils and paper are wound around hollow mandrel 14. Connection with the offset electrode is made by means of rectangular bronze spring plates 15 and 17, having bent down contacting portions 16 and 18 respectively, the edges of which make contact with electrode foils 11 and 12. Plate 17 has attached thereto wire terminal 19, soldered to the plate at 20, the wire being pulled up through mandrel 14. Plate 15 has a central aperture into which is inserted ceramic insulator 21 into which closely fits metal tube 23 through which passes wire terminal 19. In assembling the condenser after winding the wire 19 is tightly pulled up so as to cause plates 15 and 17 to make close pressure contact with the electrodes and tube 23 is then flattened as shown at 24 so as to permanently lock the assembly in place. A terminal for electrode 12 is provided by soldering a wire 25 to plate 15. After the condenser has been thus assembled it is evacuated to remove all moisture and is then impregnated with a solution of 85% hydrogenated naphthalene-15% hydrogenated castor oil 26. The impregnation is carried out at a temperature at which the dielectric will readily impregnate the condenser section and the fluid dielectric completely saturates the paper spacers. Upon removal of the section from the impregnating tank, the section is rapidly cooled by fans or the sections are immediately plunged into cool oil. The impregnant 26 acts as a complete seal for the condenser and ordinarily no additional seal is required, other than the usual container, such as cardboard or metal. If increased voltage breakdown is desirable, I may substitute a sheet of specially processed regenerated sheet cellulose for one of the paper spacers.

In Figs. 3 and 4 which show a cast form of the condenser in greatly exaggerated size, the electrodes consist of the concentric aluminum tubes 27 and 28 separated by ceramic collar 29. Rivet 33 which contacts electrode 28, extends through wide apertures 30 and 31 in ceramic collar 29 and electrode 27 respectively, and through insulating button 32. Wire terminal 34 is soldered or otherwise attached to rivet 33 and wire 35 is soldered to electrode 27 in order to provide the other terminal. After the assembly has been completed, the hydrogenated castor oil-hydrogenated naphthalene dielectric 36 is poured at a temperature of 150° C. and rapidly cooled in place into solid form. In other constructions, the dielectric in powdered form can be pressed into shape with one or both electrodes, heated to 150° C. and cooled. If desirable one of the electrodes can be formed by metal spraying and a terminal fastened to the sprayed surface.

What is claimed is:

1. A condenser dielectric comprising hydrogenated castor oil and an hydrogenated resin of the group consisting of hydrogenated naphthalene, hydrogenated turpentine and hydrogenated rosin.

2. A condenser dielectric material composed of a mixture of hydrogenated castor oil and hydrogenated naphthalene.

3. A condenser dielectric material composed of about 5% to 40% hydrogenated naphthalene and the balance substantially all hydrogenated castor oil.

SAMUEL RUBEN.